United States Patent
Mccafferty et al.

(10) Patent No.: US 12,361,841 B2
(45) Date of Patent: Jul. 15, 2025

(54) TEXTURED FILM OVERLAY FOR TOUCH-SENSITIVE DISPLAYS

(71) Applicant: NCR Atleos Corporation, Atlanta, GA (US)

(72) Inventors: Liam Mccafferty, Dundee (GB); Steven Birnie, Angus (GB); Roderick George Paterson, Perthshire (GB)

(73) Assignee: NCR Atleos Corporation, Atlanta, GA (US)

( * ) Notice: Subject to any disclaimer, the term of this patent is extended or adjusted under 35 U.S.C. 154(b) by 360 days.

(21) Appl. No.: 14/288,425

(22) Filed: May 28, 2014

(65) Prior Publication Data

US 2015/0348442 A1 Dec. 3, 2015

(51) Int. Cl.
G09B 21/00 (2006.01)
G06F 3/04886 (2022.01)

(52) U.S. Cl.
CPC ....... G09B 21/003 (2013.01); G06F 3/04886 (2013.01); *G06F 2203/04809* (2013.01); *Y10T 428/24355* (2015.01)

(58) Field of Classification Search
CPC . G06F 3/0412; G06F 3/04886; G09B 21/003; Y10T 428/24355
See application file for complete search history.

(56) References Cited

U.S. PATENT DOCUMENTS

| | | | |
|---|---|---|---|
| 2006/0181515 A1* | 8/2006 | Fletcher | G06F 3/04886 345/173 |
| 2008/0007540 A1* | 1/2008 | Ostergaard | G06F 3/0421 345/176 |
| 2011/0090626 A1* | 4/2011 | Hoellwarth | B29C 45/14639 361/679.01 |
| 2012/0007809 A1* | 1/2012 | Mahalingam | G09B 21/003 345/173 |

OTHER PUBLICATIONS

IBM "Braille Overlay For Touch Screen Pin Pad/Keyboard Entry" Published Aug. 1, 2001; Retreived from IP.com Apr. 1, 2016.*
Definition of 'Static Cling' Wikipedia, retrieved Sep. 12, 2024 (Year: 2024).*

* cited by examiner

*Primary Examiner* — Alicia J Weydemeyer
*Assistant Examiner* — Laura B Figg
(74) *Attorney, Agent, or Firm* — Schwegman Lundberg & Woessner, P.A.

(57) ABSTRACT

An overlay for a touch-sensitive display. An example overlay includes a substrate defining a substantially smooth area and a textured area wherein the textured area corresponds to a displayed key entry area of the touch-sensitive display.

3 Claims, 5 Drawing Sheets

TEXTURED FILM OVERLAY FOR TOUCH-SENSITIVE DISPLAYS

BACKGROUND

The present invention relates to enhancements to computer systems to facilitate ease of use by users with limited or no sight, and more specifically to a textured film overlay for touch-sensitive displays.

Some touch-sensitive displays or "touchscreens" have built-in key entry areas configured as keyboards and/or keypads. Some key entry areas may be designated for use as personal identification number (PIN) entry keypads, or "PIN pads". An example touch-sensitive display with a designated area where PINs are captured is illustrated in commonly assigned U.S. Pat. No. 8,456,429, entitled, "Encrypting Touch-sensitive Display". This patent is hereby incorporated by reference in its entirety.

Navigation of touch-sensitive displays with built-in key entry areas by partially sighted and blind users can be difficult. Such users may have difficulty locating the key entry areas within the touch-sensitive displays and distinguishing one key from another.

Some touch-sensitive displays have been modified to include textured glass, but these touch-sensitive displays are costly.

Therefore, it would be desirable to provide alternative, lower cost, solution that provides tactile indicators for partially sighted and blind users.

SUMMARY OF THE INVENTION

In accordance with the teachings of the present invention, a textured film overlay for touch-sensitive displays is provided.

An example overlay includes a substrate defining a substantially smooth area and a textured area wherein the textured area corresponds to a displayed key entry area of the touch-sensitive display.

BRIEF DESCRIPTION OF DRAWINGS

The present invention may take form in various components and arrangement of components and in various methods. The drawings are only for purposes of illustrating example embodiments and alternatives and are not to be construed as limiting the invention.

DESCRIPTION OF EMBODIMENTS

Figure 1:
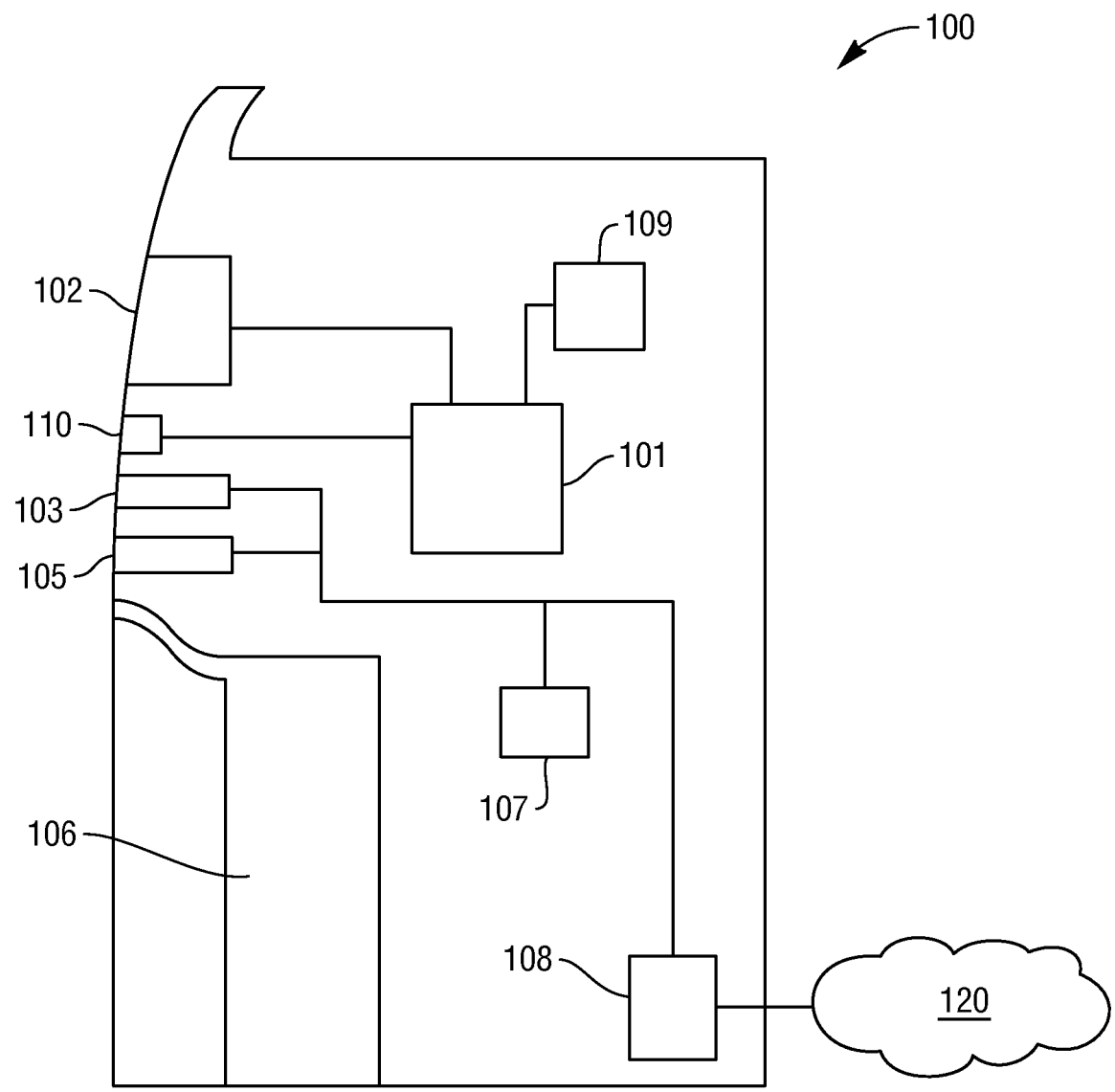
FIG. 1 illustrates an ATM connected to a network, including a touch-sensitive display.

FIG. 1 illustrates a block diagram of a Self-Service Terminal (SST) 100 in the form of an Automated Teller Machine (ATM) according to an embodiment of the present invention. It will be understood that certain embodiments of the present invention are applicable to many different types of terminal such as ATMs, vending machines, Teller Cash Recyclers (TCRs), change machines, kiosks, self-service checkout point-of-sale systems and the like. Typically, in an ATM, a sheet like item of media is to be moved from one location to another. Likewise, items of media such as, but not limited to, currency notes, checks, tickets, giros and the like may be deposited at and/or dispensed from such terminals.

The ATM 100 includes different modules for enabling transactions to be executed and recorded by the ATM 100. These ATM modules include customer transaction modules and service personnel modules. The ATM modules include an ATM controller 101, a touchscreen 102, a card reader/writer module 103, a receipt printer module 105, a cash dispenser/deposit module 106, a journal printer module 107 for creating a record of every transaction executed by the ATM, a connection module 108, an operator panel module 109 for use by a service operator (such as a field engineer, a replenisher (of currency, of printer paper or the like), or the like).

The ATM 100 may include additional modules to enhance ease of use for partially-sited or blind users. For example, ATM 100 may include sound circuitry 110 for producing voice messages and prompts. Sound circuitry 110 may include speakers and/or headphone jacks.

Certain customer transaction modules (such as the ATM controller 101) are also used by the service personnel for implementing management functions. However, some of the modules are referred to herein as service personnel modules (such as the journal printer module 107 and the operator panel module 109) because they are never used by ATM customers. The ATM 100 is a node or network end point in an overall financial network. The ATM 100 is connected to the remainder of the financial network via a connection to the internet 120. It will be appreciated that the ATM 100 could alternatively be connected to the remainder of the financial network via an intranet or other connection network.

Figure 2:
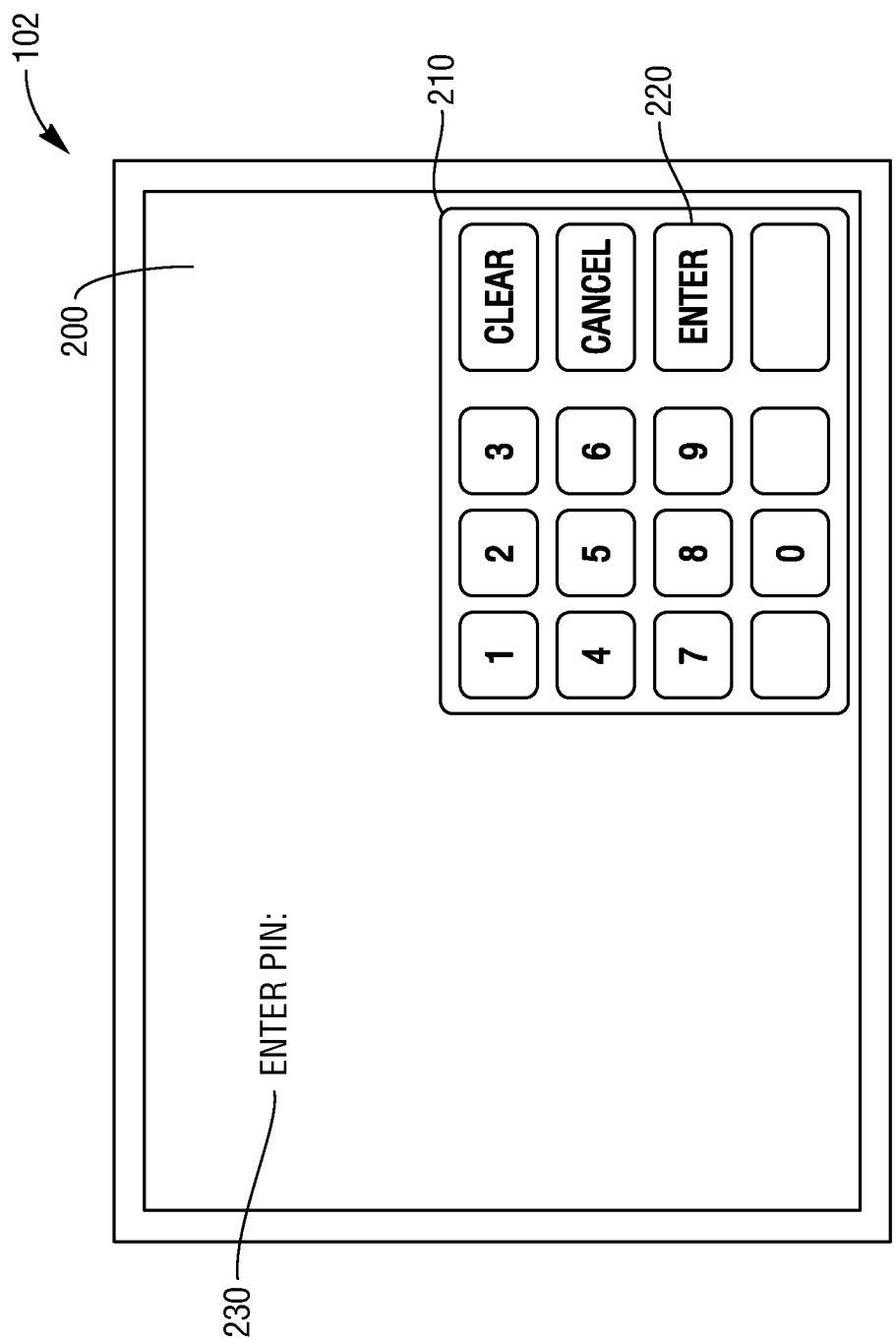
FIG. 2 is a pictorial representation of a screen layout rendered on the touch-sensitive display of FIG. 1.

Referring now to FIG. 2, an example screen displayed by touch-sensitive display 102 is illustrated. Screen 200 includes key entry area 210 including various keys 220, including numeric keys "0" through "9", an "ENTER" key, a "CLEAR" key, and a "CANCEL" key. Example key entry area 210 functions as a PIN pad.

Screen 200 may further include other text and/or graphics. For example, screen 200 may include a message 230, such as "Enter PIN".

Figure 3:
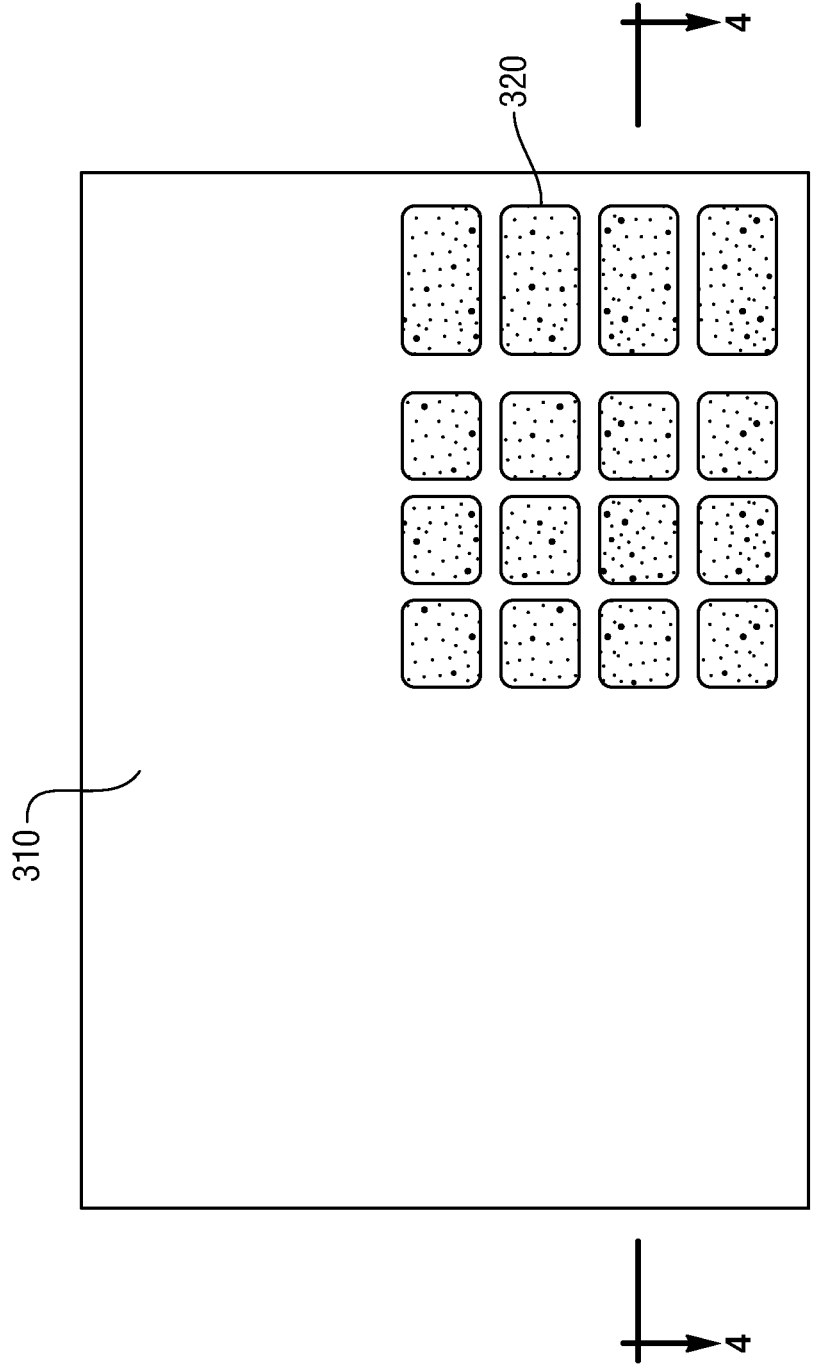
FIG. 3 is a pictorial representation of a first example overlay to the touch-sensitive display of FIG. 1.

Referring now to FIG. 3, an example overlay 300 for use with screen 200 is illustrated. Overlay 300 is substantially transparent and may include a low-cost flexible plastic film, such as a film made of polyethylene terephthalate. Overlay 300 is held in position on the surface of touch-sensitive display 102 by static electricity.

Figure 6:
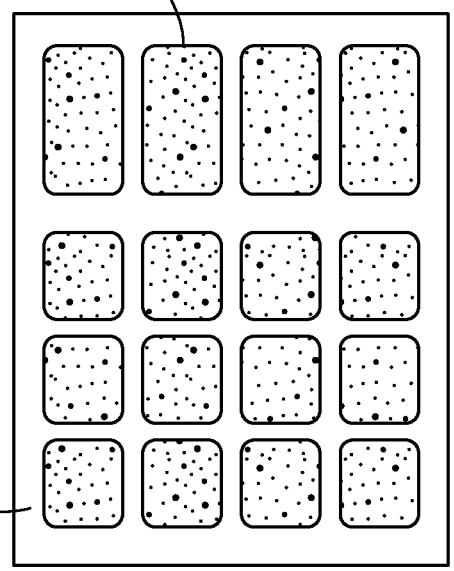
FIG. 6 is a pictorial representation of a second example overlay.

In one example embodiment (FIGS. 3 and 5), overlay 300 has an area that substantially corresponds to the available screen size of touch-sensitive display 102. In another example embodiment (FIG. 6), overlay 300 has an area less than the available screen size of touch-sensitive display 102 with minimal smooth area, but sufficient to cover key entry area 210.

Overlay 300 includes smooth or untextured areas 310 and textured areas 320. Textured areas 320 are located within overlay 300 to coincide with corresponding positions of keys 220 when overlay 300 is applied to touch-sensitive display 102.

Figure 4:
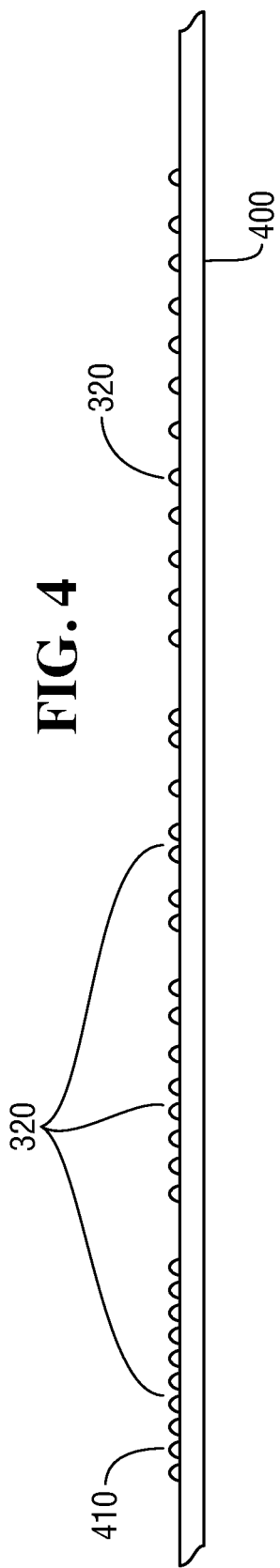
FIG. 4 is a pictorial representation of a cross-section of the overlay of FIG. 3.

Referring now to FIG. 4, overlay 300 includes a substrate 400. Textured areas 320 may include bumps, protrusions, and/or depressions and each textured area 320 may include a different number and/or pattern of bumps or protrusions and/or depressions to aid in differentiating them from one another. Textured area 320 may further include smooth areas transitioning between individual protrusions and/or depressions. Example textured areas 320 include protrusions 410 and each textured area 320 includes a different number and/or pattern of protrusions 410. Example textured areas 320 may also include Braille patterns.

Figure 5:
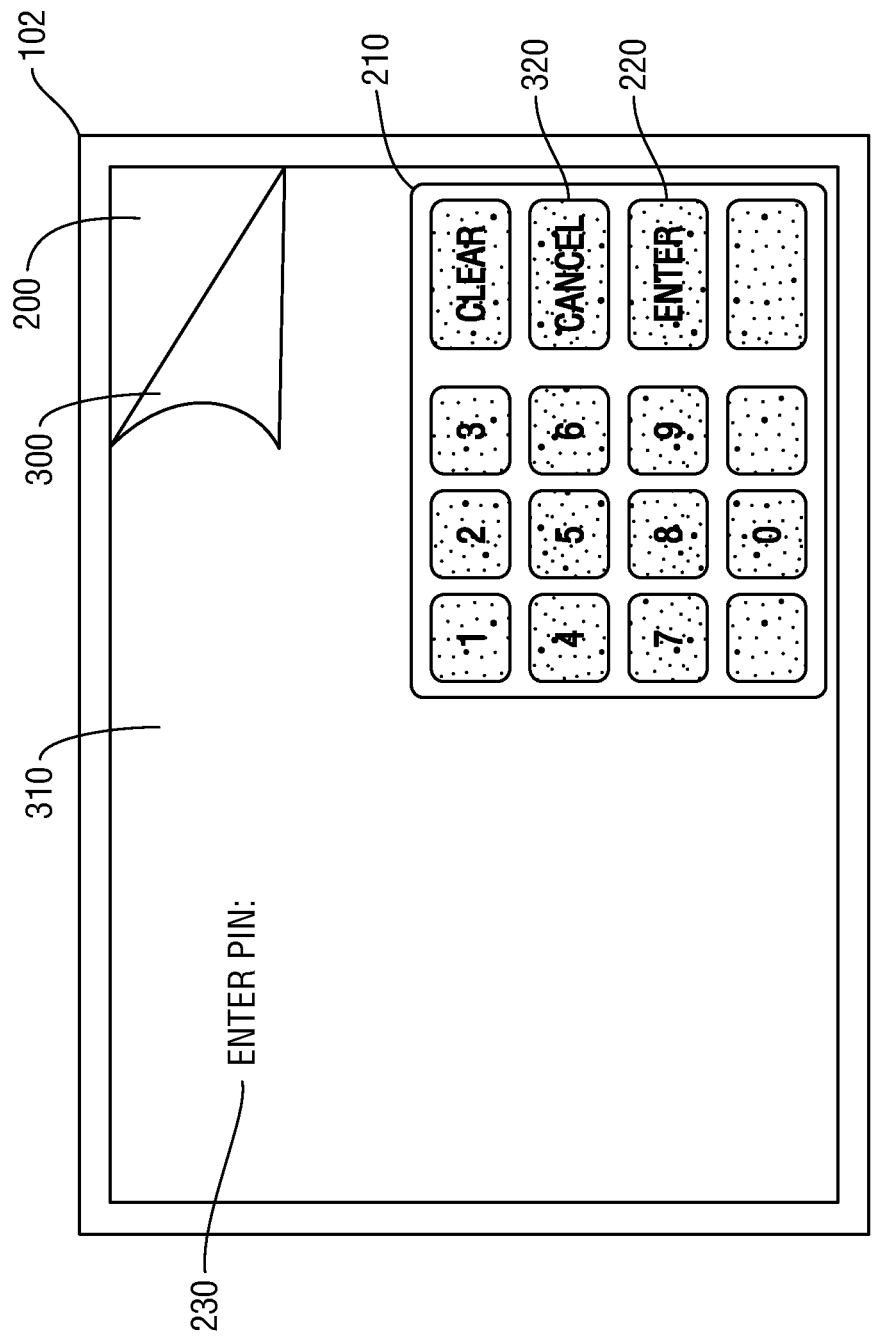
FIG. 5 is a pictorial representation of the overlay of FIG. 3 applied to the touch-sensitive display of FIG. 2.

Referring now to FIG. 5, overlay 300 is applied starting at one corner or edge of touch-sensitive display 102 and tension is applied with care taken to avoid bubbles as overlay is applied to the surface of touch-sensitive display 102. Overlay 300 may be removed by grabbing a corner of overlay 300 and peeling overlay 300 from the surface of touch-sensitive display 102.

When the ATM controller 101 displays screen 200, ATM controller 101 produces a voice message and/or prompt instructing a partially-sited or blind user to enter a PIN and alerting the user that textured areas 320 overlay key entry area 210. The user may then feel for the location of textured areas 320 and enter the PIN.

Although the present invention has been described with particular reference to certain preferred embodiments thereof, variations and modifications of the present invention can be effected within the spirit and scope of the following claims.

What is claimed is:

1. An overlay for a touch-sensitive display of an automated teller machine (ATM), comprising:
a substrate defining a substantially smooth area and a plurality of textured areas, wherein the substrate is a film made of polyethylene terephthalate, and wherein the plurality of textured areas includes bumps and depressions, and wherein each textured area includes a different number of and different pattern of the bumps and the depressions from remaining ones of the textured areas;
wherein each of the textured areas has a shape substantially equal to a shape that corresponds to a displayed key entry area of the touch-sensitive display, and wherein each of the textured areas coincide with a corresponding position of a particular key presented on the touch-sensitive display when overlay is applied to the touch-sensitive display, wherein the touch-sensitive display further includes at least one presented message to enter a Personal Identification Number (PIN) in locations of the touch-sensitive display not associated with the overlay;
wherein each space between each of the textured areas include a smooth transition area;
wherein the overlay is configured to affix to the touch-sensitive display starting at a corner or edge of the touch-sensitive display with tension applied on the corner or edge as the overlay is overlaid onto a top outer surface of the touch-sensitive display;
wherein the overlay is configured to provide a PIN pad for the touch-sensitive display during operation of the ATM, wherein the textured areas coincide with corresponding positions of keys presented on the touch-sensitive display by the ATM, and wherein the overlay comprises an area less than an available screen size of the touch-sensitive display with minimal smooth area but is sufficient to cover the displayed key entry areas;
wherein the substrate comprises a substrate area for the substrate that is less than an available screen area for the touch-sensitive display, but the substrate area is sufficient to cover the displayed key entry area;
wherein the textured areas of the overlay correspond to numbers 0-9, a clear key, a cancel key, and an enter key;
wherein the overlay is a plastic flexible film that is substantially transparent; and
wherein the film is adapted to adhere to the top outer surface of the touch-sensitive display by static electricity generated between the top outer surface of the touch-sensitive display and the film, wherein the textured areas are configured to provide tactile feedback to a user corresponding to the tactile feedback;
wherein the substrate comprises a substrate area for the substrate that is less than an available screen area for the touch-sensitive display, but the substrate area is sufficient to cover the displayed key entry area;
wherein the overlay is configured to be removed by grabbing a corner of the overlay and peeling the overlay from the surface of the touch-sensitive display.

2. The overlay of claim 1, wherein each of the displayed key entry areas comprises a key in the PIN pad.

3. An overlay for a touch sensitive-display of an automated teller machine (ATM), comprising:
a transparent plastic flexible film substrate defining a substantially smooth area and a plurality of textured areas, wherein the transparent plastic flexible film is made of polyethylene terephthalate, wherein the plurality of textured areas includes bumps and depressions, and wherein each textured area includes a different number of and different pattern of the bumps and the depressions from remaining ones of the textured areas;
wherein each of the textured areas has a shape substantially equal to a shape that corresponds to a displayed key entry area of a touch-sensitive display, wherein the displayed key entry areas correspond to individual keys of a displayed personal identification number (PIN) keypad, wherein each of the textured areas coincide with a corresponding position of a particular displayed key presented on the touch-sensitive display when the overlay is applied to the touch-sensitive display;
wherein the touch-sensitive display further includes at least one presented message to enter a Personal Identification Number (PIN) in locations of the touch-sensitive display not associated with the overlay;
wherein each space between each of the textured areas include a smooth transition area;
wherein the substrate has a substrate area less than an available screen size area of the touch-sensitive display but the substrate area is sufficient to cover a displayed PIN keypad area that corresponds to the displayed PIN keypad;
wherein the overlay is configured to affix to the touch-sensitive display starting at a corner or edge of the touch-sensitive display with tension applied on the corner or the edge as the overlay is overlaid onto a top outer surface of the touch-sensitive display;
wherein the overlay is configured to provide a PIN pad for the touch-sensitive display during operation of the ATM, wherein the textured areas coincide with corresponding positions of keys presented on the touch-sensitive display by the ATM and wherein the overlay comprises an area less than an available screen size of the touch-sensitive display with minimal smooth area but is sufficient to cover the displayed key entry areas;
wherein the textured areas of the overlay correspond to numbers 0-9, a clear key, a cancel key, and an enter key;

wherein the overlay is configured to be removed by grabbing a corner of the overlay and peeling the overlay from the surface of the touch-sensitive display; and wherein the transparent plastic flexible film is adapted to adhere to the top outer surface of the touch-sensitive display by static electricity generated between, and wherein the textured areas are configured to provide tactile feedback to a user corresponding to the tactile feedback;

wherein the substrate has a substrate area less than an available screen size area of the touch-sensitive display but the substrate area is sufficient to cover a displayed PIN keypad area that corresponds to the displayed PIN keypad.

* * * * *